March 10, 1931.   P. C. RIPLEY   1,796,163
METHOD OF AND APPARATUS FOR TREATING FLUX CORE SOLDER
Filed Dec. 16, 1929
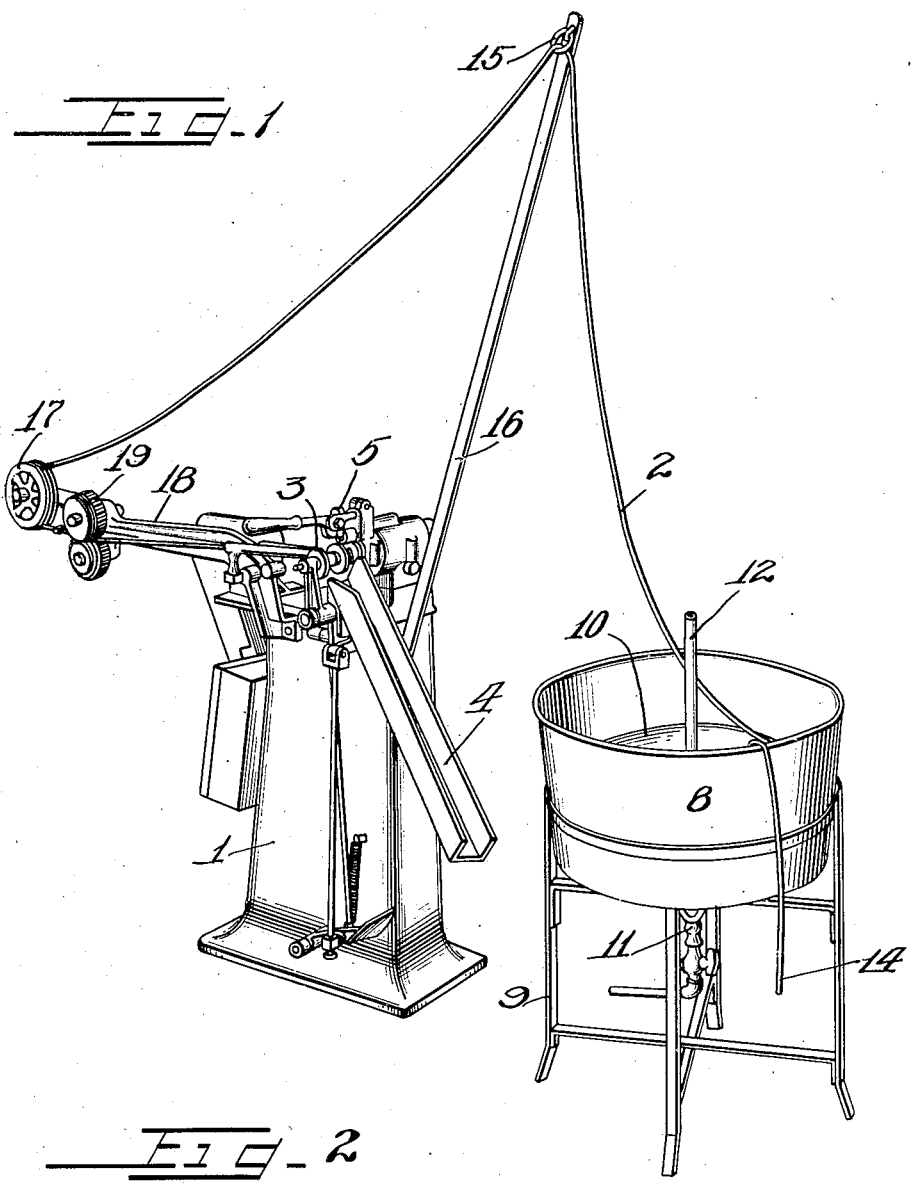
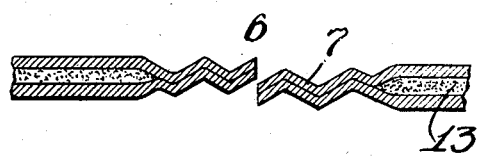
Inventor
Perry C. Ripley
by Charles W. Hills Attys Patented Mar. 10, 1931

1,796,163

UNITED STATES PATENT OFFICE

PERRY C. RIPLEY, OF CHICAGO, ILLINOIS, ASSIGNOR TO KESTER SOLDER COMPANY, OF CHICAGO, ILLINOIS, A CORPORATION OF ILLINOIS

METHOD OF AND APPARATUS FOR TREATING FLUX-CORE SOLDER

Application filed December 16, 1929. Serial No. 414,441.

This invention relates to new and useful improvements in a method of and apparatus for treating flux cored solder to prevent leakage of flux content prior to actual use.

An important object of this invention is to provide a method of and apparatus for treating flux cored solder in a manner to prevent leakage or escape of the flux under any and all climatic conditions prior to the actual use of the solder. More specifically, the invention contemplates subjecting flux cored solder to a temperature greater than any to which the solder will be normally subjected prior to its actual use regardless of geographical temperature differences and length of storage period.

Other objects and advantages of the invention will become apparent during the course of the following description.

In the drawings forming a part of the description, and wherein like numerals are employed to designate like parts through the several views:

Figure 1 is a perspective view of the apparatus for carrying out my herein disclosed method.

Figure 2 is an enlarged longitudinal section through ends of the flux cored solder after being sealed.

This invention may be employed for treating many different types of filled tubular articles, but by way of example, is herein disclosed for the purpose of sealing flux within wire solder, generally known as self-fluxing solder. This solder is usually constructed in the form of a tube, or a shell which may be oval, flat or circular in its cross-section and adapted to contain a suitable liquid flux. Such solder is supplied to the trade in varying sizes and lengths upon spools of different poundage capacity, or loosely coiled, or in short lengths, or sticks, loosely packed in suitable containers.

Due to the fact that no positively effective seal for the terminals of flux cored solder has heretofore been devised so far as I am aware, and also due to the fact that the flux and solder have different co-efficients of expansion, it has been found in actual practice that when this flux cored solder is shipped into localities having very warm or humid climates, or is subjected to elevated temperatures in transit or storage, the flux core proportionately expands beyond the relatively expanded capacity of the enclosing means and exudes or leaks through the terminals of the solder strand into or on their packages or containers and discolors both package and solder besides rendering it disagreeable to handle. Fluid fluxes possessing hygroscopic properties are particularly troublesome. Furthermore, this condition leaves the entire flux core open to the detrimental effects of air, thereby rendering the flux and the solder practically useless for the purposes for which they were designed.

To overcome this difficulty, the present invention contemplates subjecting the flux cored solder wire or flux only, prior to its being packaged, to a temperature in excess of any to which the solder is likely to be subjected either during its manufacture, or prior to its use. At such elevated temperature the flux is expanded, thereby causing part of the flux to exude from the solder and while in such expanded state filling the solder, the flux core is sealed within the solder. Consequently, under any temperature equal to, or lower than the temperature of the treatment, the flux core will not expand sufficiently to force its way through the seal established and leak out into, or upon the packages.

As the method of treating the material will be better understood when the apparatus for effecting the same is disclosed, I will now describe the simple apparatus employed.

The reference numeral 1 indicates a spooling machine on which solder wire 2 is adapted to be wound upon a spool 3. Said spool 3 is retained in the machine and rotated therein by suitable means until the desired length or weight of solder strand is wound thereon, the spool being thereafter released and discharged through a chute 4. A suitable, manually operable mechanism 5 serves to crimp and sever the solder strand to form sealed ends 6 and 7 as shown in Figure 2. As the specific features of this machine forms no part of my present invention, further details are deemed to be unnecessary.

Associated with the spooling machine 1 is a tank or receptacle 8 suitably mounted on a supporting stand 9. Said tank 8 is adapted to be partially filled with a liquid 10, such as water, which may be heated to any desired temperature by means of a gas burner 11 positioned therebeneath.

In accordance with the principles of my invention, cored solder 2 filled with a liquid flux 13 is loosely coiled about a spindle 12 that rests upon the bottom of the receptacle 8. The coil of solder wire 2 is so positioned as to be submerged in the heated fluid 10 with one of its free opened ends 14, suspended over the edge of the receptacle 8. The other end of the solder wire 2 is threaded through a guide ring 15 supported upon an arm 16 from the spool machine 1. The solder wire 2 is then trained around a grooved guide roll, or wheel 17, mounted on an extended bracket 18 from the spooling machine 1. Said bracket 18 also supports a pair of corrugated crimping rollers 19, between which the strand of wire solder passes to the spool 3. The motive power for rotating the spool 3 serves to draw the wire solder from the receptacle 8 through the guide ring 15, the grooved guide rolls 17 and crimping rollers 19. As soon as the desired length or weight of solder strand is wound upon the spool 3, the strand is severed in the crimping and severing mechanism 5 and the spool 3 discharged through the chute 4. A new spool is then inserted in the machine and the process repeated.

My invention comprises heating the wire solder filled with the liquid flux, prior to severing the wire solder into shorter strands and sealing its ends, to a temperature equal to or above that to which the solder is likely to be subjected, either in shipment or in storage, prior to its actual use. Preferably, the wire solder is heated in the bath 10 to approximately the boiling temperature of water. While being so heated, the liquid flux within the solder 2 expands and a certain portion exudes from the free end 14. The liquid flux is thus in an expanded and heated state as it passes to the spooling machine 1 and is sealed within the solder tube in such expanded state. This treatment will insure that the liquid flux will not subsequently expand, due to atmospheric variations in temperature or to temperature fluctuations while on the dealer's shelf, to an extent sufficient to open the sealed ends 6 and 7.

It will be appreciated that after the ends of the solder strand have been sealed, the liquid flux within the cored solder remains in its expanded state, due to the effective sealing of the ends against the admission of air from the outside. Consequently, if the wire solder is subjected to any temperature lower than that at which the liquid flux stood when the ends of the solder strand were sealed, no further expansion of the liquid flux takes place. There is, therefore, no tendency of the flux to develop hydrostatic pressure within the solder tube, due to ordinary fluctuations in atmospheric temperatures, prior to actual use of the solder. This is extremely important, in view of the corrosive nature of most liquid fluxes, and so far as I am aware, has never been satisfactorily solved prior to my invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of treating flux cored solder to prevent leakage of flux in storage, which comprises subjecting solder having a liquid flux core to a temperature higher than that to which the solder will normally be exposed prior to actual use to effect an expansion of the liquid flux and sealing the ends of a strand of said solder while said liquid flux is in such expanded state.

2. The method of treating flux cored solder to prevent leakage of flux from the finished solder prior to actual use, which comprises heating solder having a liquid flux core with one of its ends open until the temperature of the solder is higher than any normal temperature to which the solder may be exposed prior to actual use, the liquid flux being thereby caused to expand and exude from said open end, and sealing said open end while the liquid flux is still in its expanded state filling said solder.

3. An apparatus for treating flux cored solder, comprising a vat containing a heated fluid in which the flux core solder is adapted to be heated, means for withdrawing said solder from said vat and means for severing a strand of said solder and sealing the ends thereof.

4. Apparatus for treating solder having a liquid flux core, comprising means for heating the solder with one of its ends open to cause an expansion of the liquid flux and means for sealing said open end while the flux is in its expanded condition.

5. Apparatus for treating solder having a liquid flux core, which comprises means for uniformly heating a relatively long strand of such solder while open at one end to effect an expansion of the liquid flux, means for severing said strand to form shorter strands and means for sealing the ends of said shorter strands while the liquid flux is in its expanded state.

6. Apparatus for treating wire solder having a liquid flux core, which comprises a vat containing a heated fluid for receiving a coil of said wire solder, means for maintaining said fluid at an elevated temperature, means for withdrawing said wire solder from said vat and means for severing said wire solder into strands and sealing the ends thereof while in a heated state.

In testimony whereof I have hereunto subscribed my name at Chicago, Cook County, Illinois.

PERRY C. RIPLEY.